United States Patent [19]

Peterson

[11] Patent Number: 5,011,870
[45] Date of Patent: Apr. 30, 1991

[54] THERMALLY CONDUCTIVE ORGANOSILOXANE COMPOSITIONS

[75] Inventor: Adam L. Peterson, Midland, Mich.

[73] Assignee: Dow Corning Corporation, Midland, Mich.

[21] Appl. No.: 308,151

[22] Filed: Feb. 8, 1989

[51] Int. Cl.$^5$ .............................................. C08K 3/28
[52] U.S. Cl. ........................... 523/220; 524/80; 524/404; 524/428; 524/701; 524/786; 524/789
[58] Field of Search ............... 524/701, 786, 789, 404, 524/428, 80; 523/220

[56] References Cited

U.S. PATENT DOCUMENTS

| | | | |
|---|---|---|---|
| 3,050,490 | 8/1962 | Nitzsche et al. | 524/701 |
| 3,499,859 | 3/1970 | Matherly | 524/701 |
| 4,083,622 | 4/1978 | Neidecker | 439/86 |
| 4,147,669 | 4/1979 | Quintana et al. | 252/268 |
| 4,279,477 | 7/1981 | Tojo | 350/414 |
| 4,292,223 | 9/1981 | Theodore et al. | 524/268 |
| 4,292,225 | 9/1981 | Theodore et al. | 524/404 |
| 4,329,565 | 5/1982 | Yuichiro et al. | 219/216 |
| 4,544,696 | 10/1985 | Getson et al. | 524/428 |
| 4,574,879 | 3/1986 | Degree et al. | 165/185 |
| 4,584,336 | 4/1986 | Pate et al. | 524/433 |
| 4,588,768 | 5/1986 | Streusand | 524/433 |
| 4,602,678 | 7/1986 | Fick | 765/79 |
| 4,604,424 | 8/1986 | Cole et al. | 524/862 |
| 4,685,987 | 8/1987 | Fick | 156/247 |
| 4,763,158 | 8/1988 | Schlueter | 355/284 |
| 4,772,521 | 9/1988 | Kromrey | 428/402 |
| 4,778,860 | 10/1988 | Morita et al. | 525/431 |

FOREIGN PATENT DOCUMENTS

| | | |
|---|---|---|
| 3304857 | 9/1983 | Fed. Rep. of Germany. |
| 125539 | 10/1977 | Japan. |
| 837 | 1/1981 | Japan. |
| 56-106956 | 8/1981 | Japan .................. 524/404 |
| 144565 | 11/1981 | Japan. |
| 43059 | 3/1984 | Japan. |
| 59-145202 | 8/1984 | Japan .................. 524/404 |
| 147033 | 8/1984 | Japan. |
| 63-307748 | 12/1988 | Japan .................. 524/428 |
| 771138 | 10/1980 | U.S.S.R. . |

OTHER PUBLICATIONS

Research Disclosure No. 259,055, published Nov. 10, 1985.

Primary Examiner—Melvyn I. Marquis
Assistant Examiner—Dean, Jr. R.
Attorney, Agent, or Firm—Robert Spector

[57] ABSTRACT

The combination of known thermally conductive fillers having an average particle size of from about 10 to about 100 microns with aluminum nitride having an average particle size of less than one micron improves the thermal conductivity of organosiloxane compositions. The thermal conductivity values achieved using this combination of fillers is higher than can be achieved using the maximum loading of either filler alone that can be present without adversely affecting the ability of the organosiloxane composition to cure or to serve as useful coatings and encapsulates for electronic solid state devices and other substrates.

3 Claims, No Drawings

THERMALLY CONDUCTIVE ORGANOSILOXANE COMPOSITIONS

BACKGROUND OF THE INVENTION

1. Field of the Invention

This invention pertains to organosiloxane compositions. More particularly, this invention pertains to organosiloxane compositions containing a novel combination of thermally conductive fillers.

2. Description of the Prior Art

The properties of organosiloxane elastomers and resins make them desirable for a variety of end use applications in the field of electronics. These materials are used to coat and enoapsulate solid state electronic devices and the circuit boards on which these devices are often mounted. To function reliably over a long period of time transistors, integrated circuits and other solid state electronic devices must be protected from contact with moisture, corrosive materials and other impurities present in the environment in which these devices operate. While organosiloxane compositions effectively protect solid state devices from materials that can adversely affect their operation, they typically do not possess the thermal conductivity required to dissipate the large amounts of heat generated during operation of some solid state devices.

The rapidly advancing state of the electronics art in recent years has made it possible to reduce the size of solid state devices in response to a demand for more compact circuitry. As more of these devices are crowded into a given area to decrease the over-all size of the equipment incorporating these devices, the passage of air resulting from convection currents is no longer sufficient to dissipate the amount of heat generated at a rate that will avoid damage to the solid state devices. One method for increasing heat dissipation is to increase the thermal conductivity of the materials used to coat or encapsulate the solid state devices. This increase in thermal conductivity can be achieved by addition of thermally conductive fillers to the coating or encapsulating material.

The prior art teaches addition of a variety of fillers to organosiloxane compositions to increase the normally poor thermal conductivity of cured and grease type organosiloxane compositions. U.S. Pat. No. 4,772,521, which issued on Sept. 20, 1988 teaches mixtures of a particulate silicone rubber and a thermally conductive filler. The mixtures are used as pressurizing media for a thermal molding process. The thermally conductive fillers are particulate metals having a melting point below the temperature at which the mixtures will be used.

The use of various metals as thermally conductive fillers is taught in U.S. Pat. Nos. 4,329,565; 4,279,477; 4,292,223; 4,147,669; and 4,083,622; Japanese Laid Open Application No. 59/43059 and West German Patent No. 3,304.857. Metal oxide fillers are disclosed in U.S. Pat. Nos. 4,685,987; 4,602,678 and 4,604,424.

Japanese Laid Open Application No. 52/125,539 and Research Disclosure No. 259,055, published on November 10, 1985 teach using aluminum nitride as a thermally conductive filler in organosiloxane compositions.

The use of silicon nitride as a thermally conductive filler is taught in U.S. Pat. No. 4,544,696, which issued on Oct. 1, 1985, U.S. Pat. No. 4,588,768, which issued on May 13, 1986, and U.S. Pat. No. 4,584,336, which issued on April 22, 1986.

Boron nitride is disclosed as a thermally conductive filler for organosiloxane materials in U.S. Pat. No. 4,574,879, which issued on Mar. 11, 1986; U.S. Pat. No. 3,499,859, which issued on Mar. 10, 1970 and U.S. Pat. No. 4,763,158, which issued on Aug. 9, 1988.

Using mixtures of various thermally conductive fillers in organosiloxane resins and/or elastomers is taught in the following patents and published patent applications:

Japanese Laid Open Application No. 59/147,033—Combination of fibrous (glass, carbon, metal), scaly (mica, glass flake, metal flake) and powdered (alumina, zirconia, metal, silica) materials;

Japanese Laid Open Application No. 56/144,565 - Mixture of beryllium oxide and silicon carbide;

Russian Patent No. 771,138—Mixtures of boron nitride, zinc oxide and powdered aluminum metal;

Japanese Laid Open Application No. 56/837—mixtures of (1) boron nitride and (2) alumina, silica, magnesium oxide, zinc metal and/or mica;

An advantage of aluminum nitride is its ability to be produced with an average particle size of less than one micron and remain as discrete particles without agglomerating when combined with the ingredients of an organosiloxane composition. The disadvantage of aluminum nitride is the inability to incorporate more than about 72 percent by weight of this material into a liquid organosiloxane without adversely affecting the ability of the resultant composition to be applied as a smooth, coherent coating or a non-crumbling potting material.

One objective of this invention is to utilize the small particle size and good thermal conductivity of aluminum nitride in organosiloxane compositions. Another objective is to increase the thermal conductivity of organosiloxane compositions relative to what is achievable using prior art fillers while retaining the utility of these compositions as coatings, encapsulants and potting compounds for solid state electronic devices.

SUMMARY OF THE INVENTION

The combination of known thermally conductive fillers having an average particle size of from about 10 to about 100 microns with aluminum nitride having an average particle size of less than one micron improves the thermal conductivity of organosiloxane compositions. The thermal conductivity values achieved using this combination of fillers is higher than can be achieved using the maximum loading of either filler alone that can be present without adversely affecting the ability of the organosiloxane composition to cure or to serve as useful coatings and encapsulants for electronic solid state devices and other substrates.

DETAILED DESCRIPTION OF THE INVENTION

This invention provides an improved organosiloxane composition comprising a polyorganosiloxane and a finely divided solid thermally conductive filler. The improvement comprises the presence in said composition of a mixture of thermally conductive fillers comprising (1) from 20 to 60 weight percent, based on the weight of said mixture, of a first filler consisting essentially of aluminum nitride having an average particle size no larger than one micron and (2) at least one additional thermally conductive filler having an average particle size of from 10 to 100 microns, where said mixture constitutes from 40 to 85 percent of the total weight of said composition.

The present upper limit of 85 weight percent for the combination of all thermally conductive fillers is based on the mixture of aluminum nitride with a filler having a density of from about 2.0 to 3.0, which encompasses two of the preferred thermally conductive fillers of this invention, namely powdered silicon metal, which has a density of about 2.0 grams/c.c. and boron nitride, which has a density of 2.2 grams/c.c.

The densities of most of the other thermally conductive fillers that are compatible with organosiloxane compositions are in the range of from 2 to 3 grams/c.c. It will be understood by those skilled in this art that the volume occupied by a given weight of a filler such as silicon metal will be substantially greater than the volume occupied by the same weight of a filler such as magnesium oxide, which has a density of 3.6 grams/c.c., or zinc oxide, which has a density of 5.47 grams/c.c. If oxides within this density range are present as an ingredient of the thermally conductive filler, achieving the optimum combination of thermal conductivity and processability may require a total filler concentration that is above the upper limit of 85 weight percent specified for the present compositions.

The Thermally Conductive Filler

The feature that characterizes the present compositions is the presence in an organosiloxane composition of a combination of thermally conductive fillers consisting essentially of finely divided aluminum nitride and at least one additional known thermally conductive filler that is compatible with the polyorganosiloxane portion of the composition and has a particle size within the range of from 10 to about 100 microns. The aluminum nitride constitutes up to about 60 weight percent of this combination, and the total concentration of thermally conductive fillers constitutes up to 85 weight percent of the total composition when the densities of the filler(s) other than aluminum nitride are in the range of from 2 to 3 grams per cc, as discussed in the preceding section of this specification.

This invention is based on the synergism of the present filler combinations with respect to the thermal conductivity exhibited by the organosiloxane composition and the rheological properties of the composition. Specifically, the accompanying examples demonstrate that a liquid polydimethylsiloxane containing 72 percent by weight of aluminum nitride having an average particle size below one micron is a dry material that crumbles during blending and cannot be applied as a coherent, void-free coating. Likewise, the combination of the same polydimethylsiloxane and 81 weight percent, based on the weight of the combination of powdered silicon metal cannot be applied as a coherent void-free coating. It will be understood by those skilled in the art that the absence of voids is essential to achieving the maximum thermal conductivity from a given filler. All of the present thermally conductive fillers contain finely divided aluminum nitride having an average particle size of less than one micron. This material is commercially available from a number of suppliers, including the Dow Chemical Company. The aluminum nitride constitutes up to 60 weight percent, preferably from 20 to about 50 weight percent, of the total filler, which in turn preferably constitutes at least about 40 weight percent of the total organosiloxane composition.

The high values of thermal conductivity that characterize the present compositions are not achieved when the combined concentrations of aluminum nitride and other thermally conductive fillers total less than 40 weight percent of the organosiloxane composition. This value is preferably between about 60 and 85 weight percent.

Aluminum nitride is known to hydrolyze slowly in the presence of atmospheric moisture to form aluminum oxide, a material with a substantially larger particle size and lower thermal conductivity than aluminum nitride. For this reason it is desirable to minimize contact between the aluminum nitride and atmospheric moisture during storage and processing of this filler.

Any of the known thermally conductive fillers of the prior art, including those disclosed in the preceding sections of this specification, can be used as the second component of the present thermally conductive fillers in combination with finely divided aluminum nitride so long as the average particle size of the second component is within the range of from 10 to about 100 microns. The second component can comprise a single filler or combinations of two or more of these fillers. Finely divided metal powders and metal nitrides are preferred fillers based on the high thermal conductivity of these materials and their availability in the desired particle size range of from 10 to about 100 microns. Silicon metal, boron nitride and aluminum nitride are particularly preferred for this reason.

It should be noted that two different sizes of aluminum nitride particles, one less than one micron and the second from 10 to 100 microns, can be used as a thermally conductive filler composition of this invention.

The polyorganosiloxane

Any of the known liquid or gum-type polyorganosiloxanes can be used as a matrix material for the thermally conductive filler combinations of this invention. Polyorganosiloxanes are characterized by the presence of at least one type of repeating unit represented by the formula $R_nSiO_{(4-n)/2}$, where R represents a monovalent hydrocarbon radical or a monovalent substituted hydrocarbon radical and n represents the integer 1, 2 or 3. The average value of n for all of the repeating units in a given molecule of polyorganosiloxane will typically range from about 1.5 and 2.5.

Each molecule of polyorganosiloxane can optionally contain one or more functional groups bonded to at least one silicon atom. These groups include but not limited to hydroxyl, amino, alkoxy, carboxy, mercapto, hydrogen atoms and ethylenically unsaturated hydrocarbon radicals such as vinyl. The presence of at least two of the same type of functional group per molecule is required if it is desired to cure the polyorganosiloxane by means other than a free radical mechanism.

If it desired to incorporate a total of more than about 60 weight percent of thermally conductive fillers in a composition that can be applied as a smooth, coherent coating at room temperature using conventional equipment the viscosity at 25° C. of the polyorganosiloxane should be less than about 100 Pa.s., preferably no more than about 50 Pa.s.

If the present composition is a non-curable gel or grease the polyorganosiloxane is typically a triorganosiloxy-terminated homopolymer or copolymer where at least a portion of the repeating units are diorganosiloxane units and the organic groups bonded to the silicon atoms are alkyl containing from 1 to 4 carbon atoms, such as methyl. At least a portion of these organic groups can be fluoroalkyl, such as 3,3,3-trifluoropropyl, if it is desired that the cure composition exhibit a resistance to solubilization in liquid hydrocarbons.

The polyorganosiloxane ingredient(s) can have a linear or branched configuration, depending upon the desired properties of the cured material. polyorganosiloxanes wherein the average value of n in the preceding formula is less than about 1.8 exhibit a relatively high degree of branching and typically cure to resinous materials, whereas the products obtained by curing substantially linear polydiorganosiloxanes are gels or elastomers unless the crosslink density is unusually high.

The reactions used to cure any of the curable type thermally conductive organosiloxane compositions can be of the condensation, addition or free radical type. All of these reactions are well known to those skilled in this art and therefore do not require a detailed discussion in this specification.

Condensation reactions resulting in cured organosiloxane compositions typically occur in the presence of atmospheric moisture and involve a polyorganosiloxane containing at least two hydroxyl groups and a silane containing at least three hydrolyzable groups per molecule, such as alkoxy, acetoxy, or ketoximo. The silane can be replaced by a partial hydrolysis condensation product of the silane.

Addition curable polyorganosiloxane compositions cure by a hydrosilation reaction between a polyorganosiloxane containing at least two silicon-bonded vinyl or other ethylenically unsaturated hydrocarbon radical per molecule and an organosiloxane compound containing at least two silicon-bonded hydrogen atoms per molecule. This reaction is typically conducted in the presence of a platinum group metal or a compound thereof as the catalyst.

Applications and Advantages of the present Compositions

The organosiloxane compositions of this invention are unique by virtue of their high thermal conductivity relative to prior art filled organosiloxane compositions of similar consistency. This feature makes the present compositions especially suitable as thermally conductive coatings for electronic devices that during their operation generate large amounts of heat which must be dissipated to avoid damaging the device. Particularly preferred compositions contain at least 75 weight percent of filler, yet can be applied as coherent, substantially void-free coatings using conventional techniques.

EXAMPLES

The following examples are intended to describe preferred embodiments of the present invention and should not be interpreted as limiting the scope of the invention as defined in the accompanying claims. Unless otherwise specified all parts and percentages specified in the examples are by weight and viscosities were measured at 25 degrees C.

All of the thermal conductivity measurements reported in the examples were performed at a mean sample temperature of 100° C. using a Dynatec(R) C-Matic thermal conductivity instrument. Coatings of the samples measuring 0.25 inch (6.36 mm) in thickness were placed between two thermally resistant glass disks measuring 2.25 inches (5.7 cm.) in diameter and separated by a spacer formed from polytetrafluoroethylene.

The measuring instrument applies a known temperature differential between the upper and lower glass plates (expressed as $T_l-T_u$) and measures the resultant thermal flux (Q) passing through the sample. The thermal resistance of the sample is obtained from a calibration plot of $(Tl-Tu)/Q$ as a function of the thermal resistivity values of previously measured standard materials, expressed in (degrees C. x square meter)/watt. The thermal conductivity, expressed in units of watts/(meter °C.) is then calculated by dividing the thickness of the coating (expressed in meters) by the thermal resistance of the sample. For the present samples the thickness of the coating was $6.35 \times 10^{31\ 3}$ meters.

The mean sample temperature of 100° C. represents one half of the sum of the temperatures of the upper and lower glass plates that form part of the device used to measure thermal conductivity, and is expressed mathematically as $(T_l+T_u)/2$.

The samples evaluated for thermal conductivity were prepared by blending the thermally conductive filler(s) together with an polyorganosiloxane in a sigma blade mixer under the conditions disclosed in the accompanying examples. The polyorganosiloxane was a liquid exhibiting a viscosity of about 1 Pa.s and consisted essentially of the following concentrations of repeating units: 90 mole percent of dimethylsiloxane units, 5 mole percent of monomethylsiloxane units, 4 mole percent of trimethylsiloxy units and 1 mole percent of dimethylvinylsiloxy units. Polyorganosiloxanes of this type are described in U.S. Pat. No. 4,374,967, which issued to Brown et al. on Feb. 22, 1983.

EXAMPLE 1

This example demonstrates the improvements in thermal conductivity and processability of a polyorganosiloxane composition achieved using three different mixtures of aluminum nitride and powdered silicon metal relative to compositions containing the maximum amount of either of these fillers alone that could be incorporated into the polyorganosiloxane. The aluminum nitride exhibited a particle diameter range of from 0.4 to 0.8 micron. The particle diameter specification for the powdered silicon metal was 95% below 60 microns and a maximum particle diameter of 100 microns.

The polyorganosiloxane and filler(s) used to prepare the samples were blended for one hour under a reduced pressure in a mixer equipped with a steam heated jacket. The temperature within the mixer was about 100° C.

The concentration of the two fillers and the thermal conductivity of the resultant composition are listed in the following Table 1. The samples containing aluminum nitride or powdered silicon metal as the only filler were evaluated for purposes of comparison, and are designated by the letter C as part of the sample number. These control samples contained the maximum amount of filler that could be incorporated into a material which did not crumble during blending. When the control samples were spread onto a metal substrate they could not be applied as a coherent, void-free coating.

TABLE 1

| Sample No. | Aluminum Nitride [Wt. %] | Silicon Metal [Wt. %] | Thermal Conductivity [Watts/(m °C.)] |
| --- | --- | --- | --- |
| 1C | 0 | 81.2 | 1.85 |
| 2C | 72 | 0 | 1.91 |
| 3 | 21 | 49 | 1.46 |
| 4 | 22.5 | 52.5 | 1.63 |
| 5 | 24.2 | 56.3 | 3.1 |

TABLE 1-continued

| Sample No. | Aluminum Nitride [Wt. %] | Silicon Metal [Wt. %] | Thermal Conductivity [Watts/(m °C.)] |
| --- | --- | --- | --- |
| 6 | 41.4 | 41.4 | 2.05 |
| 7 | 49.8 | 33.0 | 1.99 |

All of the samples could be packed into the space between the two glass disks of the thermal measuring device to form a material that appeared to be free of voids, a requirement for an accurate thermal conductivity value. When samples are evaluated for thermal conductivity it is critical to place the material between the two glass disks in a manner that will ensure good contact between the sample and the glass disks.

The filler loadings in samples 1C, 2C, 6 and 7 were the maximum that could be incorporated into a composition that did not crumble during the blending operation.

The distinguishing feature of the present compositions is their unique ability to be applied as smooth, coherent coatings. The control samples could not be applied as continuous, void-free coatings on a smooth surface, even though they could be packed between the glass plates as required for an accurate thermal conductivity determination.

EXAMPLE 2

This example describes the preparation and evaluation of thermally conductive compositions of this invention containing 80 weight percent of different weight ratios of aluminum nitride to powdered silicon metal. The silicon metal was treated with hexamethyl disilazane in the presence of the polyorganosiloxane. The unreacted treating agent was then removed by heating under reduced pressure and the required amount of aluminum nitride added. The compositions were then blended to homogeneity in a sigma blade mixer heated to a temperature of 100° C. The contents of the blender were maintained under reduced pressure to remove any water introduced with the filler(s).

The thermal conductivity values for these samples are recorded in Table 2.

Table 2

| Sample No. | % Si | % AlN | Thermal COnductivity |
| --- | --- | --- | --- |
| 6C | 80 | 0 | 1.68 |
| 7C | 72 | 8 | 1.61 |
| 8 | 64 | 16 | 1.81 |
| 9 | 60 | 20 | 1.78 |
| 10 | 48 | 32 | 1.76 |
| 11 | 40 | 40 | 1.84 |
| 12 | 32 | 48 | 1.61 |
| 13 | 20 | 60 | 1.68 |

These data demonstrate that thermal conductivity is maximized when the weight ratio of silicon metal to aluminum nitride is between about 1:1 and 4:1, i.e. the aluminum nitride constitutes from 20 to 50 percent of the total filler.

That which is claimed is:

1. In an organosiloxane composition comprising a polyorganosiloxane and a finely divided solid thermally conductive filler, the improvement comprising the presence in said composition of a mixture of thermally conductive fillers comprising (1) from 20 to 60 weight percent, based on the weight of said mixture, of a first filler consisting essentially of aluminum nitride having an average particle size no larger than one micron and (2) at least one additional thermally conductive filler having an average particle size of from 10 to 100 microns. where said mixture constitutes from 40 to 85 percent of the total weight of said composition.

2. An organosiloxane composition according to claim 1 where said additional thermally conductive filler comprises at least one member selected from the group consisting of powdered silicon metal, boron nitride or aluminum nitride, said first filler constitutes from 20 to 50 weight percent of the total thermally conductive filler, the mixture of thermally conductive fillers constitutes from 60 to 85 weight percent of said composition, and said polyorganosiloxane is an uncured liquid material or a liquid material that has been cured by an addition, condensation or free radical reaction.

3. An organosiloxane composition according to claim 2 where said polyorganosiloxane is an uncured liquid having a viscosity of less than 100 Pa.s at 25° C., the silicon-bonded organic groups of said polyorganosiloxane are methyl or 3,3,3-trifluoropropyl and the combined thermally conductive fillers constitute at least 75 weight percent of said composition.

* * * * *